(12) United States Patent
Sena

(10) Patent No.: US 9,739,905 B2
(45) Date of Patent: Aug. 22, 2017

(54) ELECTROMAGNETIC TIME-LAPSE REMOTE SENSING OF RESERVOIR CONDITIONS

(71) Applicant: Saudi Arabian Oil Company, Dhahran (SA)

(72) Inventor: Armando Ruggiero Sena, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 283 days.

(21) Appl. No.: 14/323,120

(22) Filed: Jul. 3, 2014

(65) Prior Publication Data
US 2016/0003962 A1   Jan. 7, 2016

(51) Int. Cl.
| | | |
|---|---|---|
| *G01V 3/00* | (2006.01) | |
| *G01V 3/28* | (2006.01) | |
| *G01V 3/30* | (2006.01) | |
| *E21B 47/09* | (2012.01) | |

(52) U.S. Cl.
CPC ............ *G01V 3/28* (2013.01); *E21B 47/0905* (2013.01); *G01V 3/30* (2013.01)

(58) Field of Classification Search
CPC .............. G01V 3/20; G01V 3/28; G01V 3/30
USPC .................................................. 324/338, 339
See application file for complete search history.

(56) References Cited

U.S. PATENT DOCUMENTS

| | | | |
|---|---|---|---|
| 2,077,707 | A | 4/1937 | Melton |
| 5,084,678 | A * | 1/1992 | Hutin ....................... G01V 3/26 175/45 |
| 5,767,680 | A | 6/1998 | Torres-Verdin et al. |
| 6,182,013 | B1 | 1/2001 | Malinverno et al. |
| 6,525,540 | B1 | 2/2003 | Kong et al. |
| 6,886,632 | B2 | 5/2005 | Raghuraman et al. |

(Continued)

FOREIGN PATENT DOCUMENTS

| | | |
|---|---|---|
| GB | 2355477 A | 4/2001 |
| WO | 2005/085909 A1 | 9/2005 |

OTHER PUBLICATIONS

PCT International Search Report and The Written Opinion of the International Searching Authority dated Oct. 20, 2015; International Application No. PCT/US2015/038437; International Filing Date: Jun. 30, 2014.

(Continued)

*Primary Examiner* — Reena Aurora
(74) *Attorney, Agent, or Firm* — Bracewell LLP; Constance G. Rhebergen

(57) ABSTRACT

A method for sensing a condition of a hydrocarbon reservoir from a subterranean well having a lined section with a liner and an unlined section includes attaching an electric current sensor to the liner proximate to a lower end of the lined section and a plurality of electromagnetic sources located along the unlined section. The electromagnetic sources are activated independently and the resulting current induced in the liner by each electromagnetic source is measured with the electric current sensor. These measurements can be inverted to determine the spatial distribution of the electric conductivity within the reservoir and its changes in time due to fluid substitution during production. Alternatively, a fast and robust method for interpretation of the data is presented for early detection and location of a possible water front approaching the production well.

25 Claims, 6 Drawing Sheets

(56) References Cited

U.S. PATENT DOCUMENTS

| | | |
|---|---|---|
| 6,975,120 B2 | 12/2005 | Amini |
| 6,999,878 B2 | 2/2006 | Manin |
| 7,151,377 B2 | 12/2006 | Chouzenoux et al. |
| 8,554,482 B2 | 10/2013 | Fincher et al. |
| 8,598,882 B2 | 12/2013 | Meekes |
| 2003/0209347 A1 | 11/2003 | Clark et al. |
| 2006/0038570 A1 | 2/2006 | Constable |
| 2008/0262735 A1 | 10/2008 | Thigpen et al. |
| 2009/0005994 A1 | 1/2009 | Srnka et al. |
| 2010/0259267 A1 | 10/2010 | Rosthal et al. |
| 2010/0286915 A1 | 11/2010 | Fincher et al. |
| 2011/0001482 A1 | 1/2011 | Alumbaugh et al. |
| 2012/0056623 A1 | 3/2012 | Esmersoy |
| 2012/0126816 A1 | 5/2012 | Meekes |

OTHER PUBLICATIONS

Almalki, M., et al.; Multifrequency Full-Waveform Sonic Logging in the Screened Interval of a Large-Diameter Production Well; Geophysics; Sep.-Oct. 2013; pp. B243-B257; vol. 78, No. 5; Society of Exploration Geophysicists.

\* cited by examiner

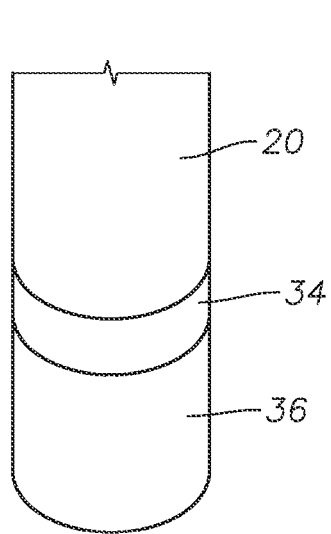
FIG. 2
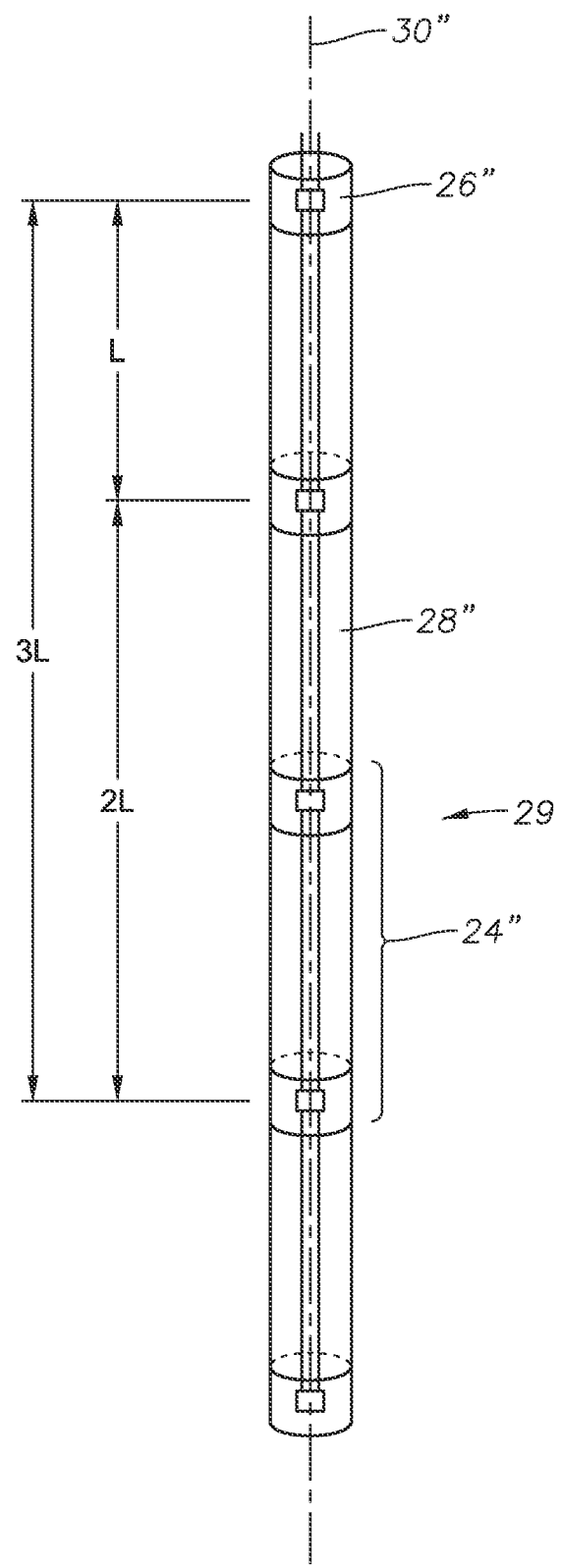
FIG. 3a
FIG. 3b

ELECTROMAGNETIC TIME-LAPSE REMOTE SENSING OF RESERVOIR CONDITIONS

BACKGROUND OF THE INVENTION

1. Field of the Invention

The present invention relates to remote sensing of reservoir conditions during the production of hydrocarbons. More specifically, the invention relates to systems and methods for measuring and interpreting electric currents induced in liners (or casing) of production wells by electromagnetic sources located in adjacent unlined sections.

2. Description of the Related Art

During hydrocarbon production and management the occurrence of water breakthroughs, in particular during water injection, constitutes an undesirable event because of the drop of oil/water ratio and the extra costs that could be incurred to rehabilitate the affected production wells. The water breakthrough may also imply changes in the properties of the reservoir, such as wettability and relative permeability that might be difficult to revert. The formation of water-flooding paths connecting injector and production wells can bypass sweet spots in the reservoir, rendering the stimulated production ineffective and ultimately leading to the abandonment of affected production wells due to non-economical water/oil-cut levels. Current technology detects the water front when it has already reached the well (such as the in US Patent Application Pub. No.: 2008/0262735A1), or senses the approaching water fronts when they are at such small distance from the wellbore (for example, existing inductive electromagnetic well logging tools) that modifications of production variables cannot avoid undesired changes of the reservoir properties that already have taken place in the vicinity of the production wells and the adverse consequences and costs associated with the water breakthrough.

Current electromagnetic monitoring systems such as the ones disclosed in the US Patent Application Pub. No.: 2006/003857A1 or US Patent Application Pub. No.: 2009/0005994A1 use sensors or sources on the surface to monitor changes in the reservoir, but this reduces the detectability and discrimination of these techniques, and even when sources and receivers are proposed to be located in the well, no system published to date has proposed to measure the current induced in adjacent liners or casing as part of the receiver (detector) that sense the electromagnetic response of the subsurface.

SUMMARY OF THE INVENTION

The present invention relates to the use of electromagnetic fields for remote sensing of reservoir conditions during the production of hydrocarbons, specifically to systems and methods for measuring and interpreting electric currents induced in liners (or casing) of production wells by electromagnetic sources located in adjacent open-hole sections. These measurements are intended to determine the electric conductivity of the reservoir and its changes in time due to fluid substitution during production. This will allow for early detection (that is, before water breakthrough occurs) of approaching water fronts to the production wells and help on improving the characterization of the reservoir.

Embodiments of the current disclosure use the electric current induced in the casing or liners by electromagnetic sources located in adjacent open-hole sections of the well to increase the detectability range and discrimination of the electromagnetic monitoring system as the casing or liners acts as an increased size antenna, improving the sensitivity of the system. The systems and method disclosed herein provide for electromagnetic monitoring of the reservoir using this induced current in the adjacent liner or casing, including a robust qualitative interpretation method for fast detection of waterfronts approaching the well, as well as the possibility to use data inversion techniques to obtain more quantitative interpretations of the data, and therefore, improve the capabilities of the monitoring system.

Embodiments of this disclosure provide systems and methods for remote sensing and monitoring of open-hole wells that allow for early responses to approaching water fronts to avoid water breakthroughs, improve production management, extend the life and production of reservoirs and reduce operational costs. The systems and methods of this disclosure can reduce or eliminate the cost of remediation measures commonly used when production wells experience a water breakthrough, the losses due to decline of production, and in some cases, when these wells do not respond favorably to remediation measures, cost of abandonment and drilling of new replacement wells. Because the approaching water front can be detected at tens of meters from the production well, preventive measures can be implemented early on to avoid the water breakthrough and measures can be undertaken to prevent undesirable changes of wettability and permeability in the vicinity of the production well and to maximize oil recovery by improving the sweeping strategy. The information obtained can also be used to update the reservoir model, and therefore, optimize oil production and sweep efficiency. Embodiments of this disclosure can be particularly useful in horizontal wells.

In one embodiment of this disclosure, a method for sensing the condition of a hydrocarbon reservoir from a subterranean production well having a lined section with a liner and an adjacent unlined section includes attaching an electric current sensor to the liner proximate to a lower end of the lined section to measure the electric current flowing through the liner at that position. A plurality of electromagnetic sources can be located along the adjacent unlined section. An electromagnetic field is generated by activating each electromagnetic source separately so that a source current is generated by each of the electromagnetic sources. The resulting current induced in the liner by each electromagnetic source during the activation of such electromagnetic source is measured with the electric current sensor.

In alternate embodiments, after some time has elapsed another series of measurements is repeated by generating a source current with the electromagnetic sources and the resulting current induced in the liner during the activation of each electromagnetic source is measured with the electric current sensor. A change in electrical conductivity of the hydrocarbon reservoir can be calculated by comparing the resulting current in the liner induced by each electromagnetic source measured to the subsequently (time-lapsed) measured resulting current in the liner induced by each electromagnetic source.

In an alternate embodiment, an inversion of the data collected according to the description aforementioned can be carry out to obtain the electric conductivity and its corresponding time-lapse changes around the production well. The changes in electrical conductivity can be analyzed or interpreted and a distance from the subterranean well to a possibly approaching water front can be determined. Furthermore, the technique allows for an alternative, robust and fast qualitative interpretation by observing any polarity reversal of the time-lapse changes of induced current over time for each electromagnetic source. When a time-lapse change of the induced current shows a polarity reversal for a given source, the water front has become closer to that source than to the other sources (for which no time-lapse change polarity reversal has been yet observed). This qualitative criterion is robust, and allows for fast implementation of production management responses in case that an inversion of the acquired data is not possible or available immediately.

The detection range (or penetration depth) measured perpendicularly from the axis of the subterranean well can be in the order of tens to a few hundreds of meters. The exact detection range depends on the frequency of the electromagnetic fields, strength (power) of the electromagnetic sources and sensitivity of the electric current sensor used. The lower the frequency of the electromagnetic fields generated, the greater the range of detection. Similarly, the more powerful the sources and more sensitive the current sensors are the greater the range of detection. Therefore, the range of detection aforementioned is only an estimation obtained by numerical modeling supposing the use of current technologies (power of sources and sensitivity of electric current sensors) and typical open-hole production well scenarios.

In other alternate embodiments, one of the plurality of electromagnetic sources is located proximate to the lower end of the lined section of the subterranean well and the method includes using the resulting current induced in the liner by this near electromagnetic source to normalize the resulting current induced in the liner by each of the other electromagnetic sources.

In yet other alternate embodiments, the electromagnetic fields can be generated with frequencies that are typically within (but not limited to) the range of 0.1 Hz to 10 KHz. Once the frequency (or set of frequencies) has been selected, the power (or set of power values) to be used for the sources can be established according to the depth of penetration (detection range) desired, sensitivity of the electric current sensor and total noise level in the system (i.e., natural plus instrumental).

In another embodiment of the current disclosure, a method for sensing an approaching water front to a hydrocarbon reservoir, from a subterranean well having a lined section with a liner and an adjacent unlined section, includes attaching an electric current sensor to the liner at a lower end of the lined section. A plurality of electromagnetic sources are located along the unlined section. A source current is generated with the electromagnetic sources and the original resulting current induced in the liner by each electromagnetic source is measured with the electric current sensor. A subsequent source current is generated with the electromagnetic sources and the subsequent resulting current induced in the liner by each electromagnetic source is measured with the electric current sensor. The subsequent resulting current induced in the liner by each electromagnetic source is compared to the original resulting current for that electromagnetic source to determine a change in resulting current over time. The original resulting current and the subsequent resulting current are inverted to obtain an electric conductivity distribution in the reservoir and a change over time of the electric conductivity distribution in the reservoir to identify the approaching water front.

In yet another embodiment of this disclosure, a system for sensing a condition of a hydrocarbon reservoir from a subterranean well having a lined section with a liner and an unlined section includes a plurality of electromagnetic sources spaced along the unlined section. The electromagnetic sources selectively generate a source current. An electric current sensor is attached to the liner at a lower end of the lined section. The electric current sensor measures the resulting current induced in the liner by each electromagnetic source.

In alternate embodiment, each electromagnetic source is a galvanic electric dipole having electrodes at each end, separated by isolating material. Alternately, each electromagnetic source can be a magnetic dipole or an inductive electric dipole.

In other alternate embodiments, a liner extension can be located at an end of the electric current sensor opposite the liner, with the electric current sensor electrically connecting the liner to the liner extension or measuring the current flowing from the liner to the liner extension. In this way an optimal distance for location of the current detector can be obtained in practice.

In other alternate embodiments, the plurality of electromagnetic sources include a normalizing electromagnetic source located proximate to the lower end of the lined section and spaced apart from the liner. A control system can schedule the timing of the generation of the source current. A data collection and analysis system can gather the resulting current induced in the liner by each electromagnetic source and determine the electric conductivity of the reservoir around the production well and its time-lapse variation, and so, the perpendicular distance from the subterranean well to a possible approaching water front can be interpreted.

In yet another embodiment of this disclosure, systems of electromagnetic sources and electric current sensors, as described above, can be located in multiple lower ends of liners and its corresponding open-hole sections to cover the monitoring of a full well and jointly process and interpret the data. Analogously, if nearby wells exist separated by a distance small enough to allow the receiver deployed in one well to measure a significant signal (i.e., above the noise level) when the sources in an adjacent well are activated, then that data can also be employed for inversion and interpretation to obtain the electric conductivity, and its time-lapse changes, in the reservoir. A plurality of electromagnetic sources can therefore be spaced along the unlined section of the subterranean well, an unlined section of an adjacent well, or an unlined section of a multilateral portion of the subterranean well. The electric current sensor can be attached to a liner of the subterranean well, the adjacent well, and/or the liners of multilateral portions of the subterranean well.

In alternate embodiments of the current disclosure, the plurality of electromagnetic sources can include an array of multiple controlled sources spaced in a single tool, or the plurality of electromagnetic sources can include a tool that has a single source and is operable to be moved along the unlined section of the subterranean well and be activated at different pre-established locations along the subterranean well.

BRIEF DESCRIPTION OF THE DRAWINGS

So that the manner in which the above-recited features, aspects and advantages of the invention, as well as others that will become apparent, are attained and can be understood in detail, a more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

FIG. 2 is a schematic perspective view of an example electric current sensor location of an embodiment of this disclosure.

FIG. 3a is a schematic perspective view of an example electromagnetic source of the remote sensing system of an embodiment of this disclosure.

FIG. 3b is a schematic perspective view of an alternative example controlled array for activating different electromagnetic source configurations (in this particular example, galvanic electric dipole sources) of an embodiment of this disclosure.

FIG. 4b is a detail of the location of the water fronts at different time-lapses of the reservoir model example of FIG. 4a.

FIG. 4c is a detail of the location of the subterranean well, casing or liner, and electromagnetic sources of the reservoir model example FIG. 4a.

FIGS. 5a-5c are graphs showing the real part of current induced along the casing by sources S1, S2 and S4, respectively, at time-lapses T0, T2, and T4, from computer modeling using the reservoir model example of FIG. 4a.

FIGS. 6a-6b are graphs showing time-lapse changes in the time-lapses intervals T0 to T2, and T0 to T4, respectively, of the real part of the current induced along the casing by the sources S1, S2 and S4, from the computer modeling using the reservoir model example of FIG. 4a.

DETAILED DESCRIPTION OF THE EXEMPLARY EMBODIMENTS

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments or positions.

In the following discussion, numerous specific details are set forth to provide a thorough understanding of the present invention. However, it will be obvious to those skilled in the art that the present invention can be practiced without such specific details. Additionally, for the most part, details concerning well drilling, reservoir testing, well completion and the like have been omitted inasmuch as such details are not considered necessary to obtain a complete understanding of the present invention, and are considered to be within the skills of persons skilled in the relevant art.

Figure 1:
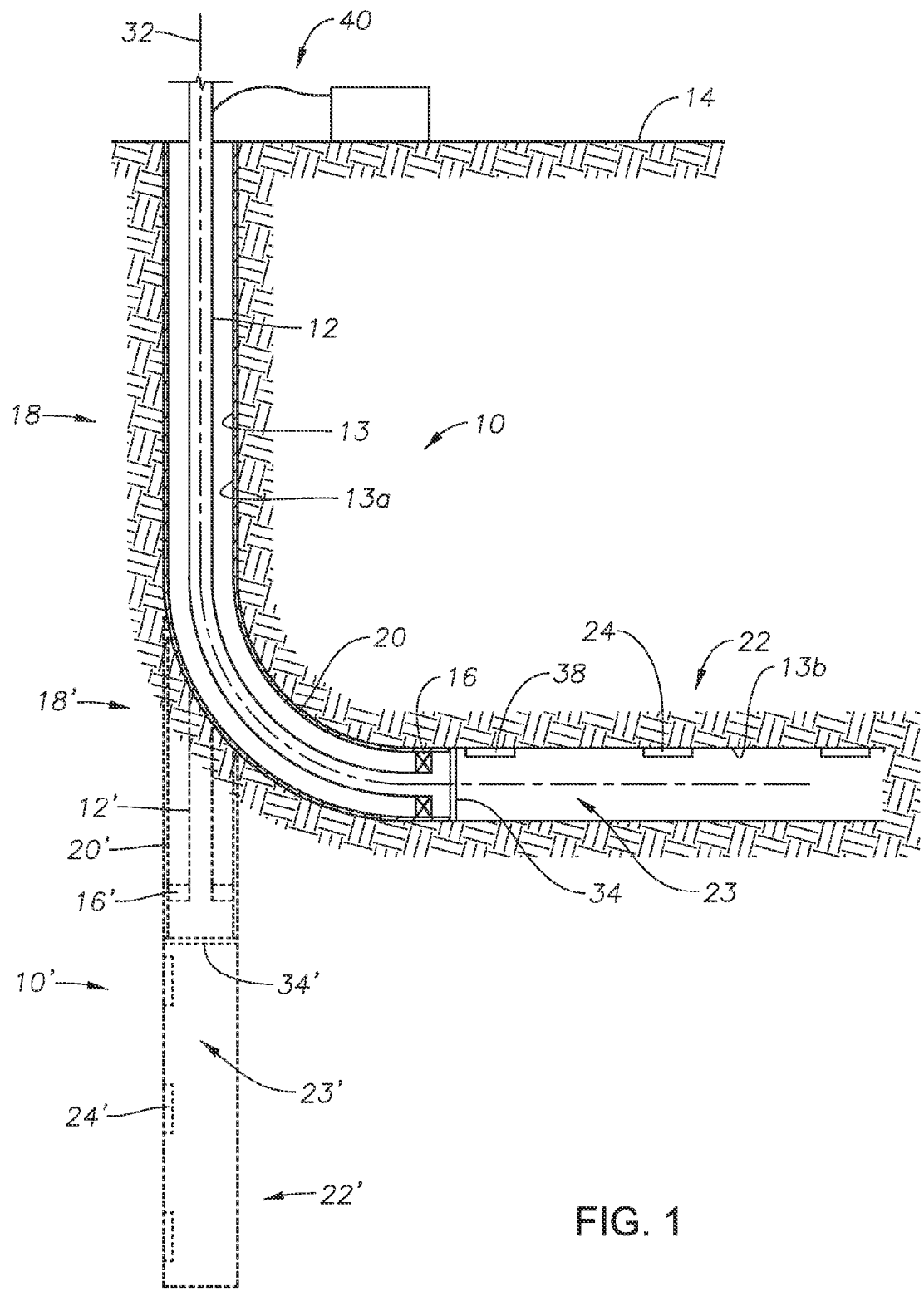
FIG. 1 is a schematic section view of a subterranean well with a remote sensing system in accordance with an embodiment of this disclosure.

Referring to FIG. 1, a hydrocarbon development includes subterranean well 10. Subterranean well 10 can have a production tubing 12 extending into wellbore 13 of subterranean well 10 for returning hydrocarbons produced from a hydrocarbon reservoir, and other fluids from within subterranean well 10, to the surface 14. A packer 16 can seal an annular space between a lower end of production tubing 12 and an inner circumference of wellbore 13 of subterranean well 10. Wellbore 13 of subterranean well 10 includes a main bore 13a which is generally vertical, and a horizontal or lateral bore 13b that extends from main bore 13a.

Subterranean well 10 has a lined section 18, which has a tubular casing or liner 20 along the inner circumference of wellbore 13. Subterranean well 10 also has an unlined section 22, which is open in that there is no tubular member along the inner circumference of wellbore 13. In the example of FIG. 1, subterranean well 10 has a single lined section 18 which is proximate to surface 14 and extends along main bore 13a and into lateral bore 13b. A single unlined section 22 is located at an end of lined section 18 and extends along lateral bore 13b. In alternate embodiments, subterranean well 10 can include more than one lined section 18 and more than one unlined section 22 at locations along wellbore 13.

Looking at FIGS. 1 and 3a-3b, remote sensing system 23 includes electromagnetic source 24. Two or more surfaces of the electromagnetic sources 24, when galvanic coupling to the medium is used, can be plated with an inert metal to allow for more efficient injection of current in the formation surrounding wellbore 13. Electromagnetic sources 24 are activated selectively to generate an electromagnetic field in the surrounding medium. The sources can generate an electromagnetic field with a typical (but not limited to) frequency range between 0.1 Hz and 10 KHz, and alternately, a frequency of 10 Hz. Electromagnetic source 24 can be positioned within wellbore 13 so that source axis 30 is generally parallel to bore central axis 32.

In the embodiment of FIGS. 1 and 3a, a plurality of separate electromagnetic sources 24' are spaced at regular distances from the bottom end of liner 20 along unlined section 22 of subterranean well 10. Alternatively, although less practical, a single source can be moved to different locations along the open-hole section for consecutive measurements. Each electromagnetic source 24' can be, as an example, a simple, and therefore robust electric galvanic dipole parallel to the well axis, injecting a low frequency electric current to the surrounding medium and having the current amplitude and phase controlled and monitored (i.e., measured). Electromagnetic source 24' can include an electrode 26' at each end. The electrodes 26' of each electromagnetic source 24' are separated by isolating material 28'.

Although for the purpose of explaining this invention galvanic electric dipole sources have been described as examples, the invention is not limited to the use of this type of sources only. As another example, an alternative electromagnetic source is a toroidal inductive coil. When the axis of symmetry of the toroidal coil source is parallel to the well axis, this source produces a similar radiation pattern to the aforementioned electric dipole source but in this case the coupling of the source to the surrounding medium is inductive, which could be useful in cases where a poor galvanic coupling (between the source and the surrounding medium) is present. Similarly, although the orientation of the dipole sources described in this invention could correspond to a maximum of sensitivity for the monitoring system, the use of different dipole source orientations, with possible benefits for monitoring and detection, as for example, spatial discrimination capabilities, are implied and included in this invention disclosure.

In the alternate embodiment of FIG. 3b, a controlled electrode array 29 includes the plurality of potential electromagnetic sources 24". Electrode array 29 is located within unlined section 22 of subterranean well 10 (FIG. 1). Electrode array 29 can include a plurality of electrodes 26", each electrode 26" being separated from the next electrode 26" by isolating material 28". Each electromagnetic source 24" is defined by a pair of electrodes 26" that are spaced apart by isolating material 28" and by other electrodes 26", if applicable. In order to generate a source current, the pair of electrodes 26" through which the electric current will be passed can be selected by control system 40. Control system 40 is further described below. In this way, the length and location of electromagnetic source 24" along the unlined section 22 of subterranean well 10 can be controlled. For example, if each electrode 26" is spaced a distance L from the next electrode 26", a pair of electrodes 26" can be selected that are a distance L apart or a multiple of distance L apart, such as 2L or 3L apart. The distance of penetration of source current in the formation, measured in a direction perpendicular to central axis 32, is directly dependent on the length of electromagnetic source 24", such that the greater the distance between the pair of electrodes 26", the greater the penetration of source current in the formation. In addition, the location of the center point of the distance between the selected pair of electrodes 26" will determine the spatial resolution of the monitoring system along the direction of the well axis (central axis 32). Therefore, an operator can selectively activate certain pairs of electrodes 26" to provide an electromagnetic source 24" that will provide a desired penetration depth of the source current and spatial resolution along the well axis to better pinpoint the location of an approaching waterfront.

Turning to FIGS. 1-2, electric current sensor 34 is attached to liner 20 at a lower end of lined section 18 of wellbore 13 of subterranean well 10. In certain embodiments, liner extension 36 can optionally be located at an end of electric current sensor 34 opposite liner 20, in which case the electric current sensor 34 electrically connects (i.e., allows the current to flow back and ford from) liner 20 to liner extension 36.

Electric current sensor 34 measures the resulting current induced in liner 20 by each electromagnetic source 24. The magnitude of the resulting current in liner 20 can have a dynamic range of 5 to 6 orders of magnitude in order for the systems and methods of this disclosure to detect a water front approaching from tens of meters away from wellbore 13, and in certain embodiments, up to a few hundred meters away from wellbore 13. Electric current sensors 34 have the capability to detect currents with a dynamic range of 5 to 6 orders of magnitude, in particular, when phase-locking discrimination and amplification is used. Because of the position of electric current sensor 34 at the lower end of lined section 18, electric current sensor 34 measures the resulting current entering or exiting the liner 20 where the electrical current, induced in liner 20, has a magnitude close to its maximum. The use of an extension liner 36 of optimal length can help to maximize the detected current. Therefore, the resulting current in liner 20 is being measured at a location that provides the best sensitivity.

In addition, the sensitivity and efficiency of the systems and methods of this disclosure are due in part to the fact that liner 20, which has a significant length (for example, in the example shown in FIG. 1, it extends all the way from surface 14), operates as a very large antenna. Liner 20 acting as a very large antenna increases the sensitivity of remote sensing system 23 and allows for remote sensing of water fronts at distances of tens, and in favorable conditions up to a few hundreds, of meters from wellbore 13. However, as a result of using the liner to obtain remote sensing over longer distances, it is important to have a mechanism for correcting for changes of the electrical coupling of liner 20 to the surrounding formation when those changes are not directly related to changes in the hydrocarbon reservoir. In order to provide such correction mechanism, one of the plurality of electromagnetic sources 24 is a normalizing electromagnetic source 38. Normalizing electromagnetic source 38 is located close to the lower end of lined section 18, but separated some distance so that it does not touch liner 20. Normalizing electromagnetic source 38 can be used as a reference electromagnetic source to normalize the resulting current induced in liner 20 by each of the other electromagnetic sources 24. This will provide robust systems and methods that are insensitive to other (i.e., non reservoir related) changes in the electrical coupling between liner 20 and the formations surrounding liner 20.

Remote sensing system 23 includes a control and data acquisition system 40 that can control and schedule the selection of the electromagnetic source 24 to be activated, the timing of the generation of the source current, and measure and records the currents detected by the current sensor(s) 34. Control system 40 can further include a data collection and analysis system for gathering the resulting current induced in liner 20 by each electromagnetic source 24 and processing and interpreting the acquired data to determine the distribution, and time-lapse changes, of the electrical conductivity of the reservoir in the vicinity of the open-hole section of wellbore 13 and the distance from wellbore 13 to a possibly approaching water front. Control system 40 can use wires to transmit and receive signals, and alternately wellbore wireless communication means to perform some of the functions of control system 40. Control system 40 can also provide the power required to operate electromagnetic sources 24 and electric current sensor 34.

As is shown in FIG. 1, subterranean well 10' can alternately be a generally vertical well without a horizontal or lateral bore. In such an embodiment, subterranean well 10' has a production tubing 12' extending into subterranean well 10' for returning hydrocarbons produced from the hydrocarbon reservoir and other fluids from within subterranean well 10' to surface 14 and also has packer 16'. Subterranean well 10' has a lined section 18', which has a tubular casing or liner 20' along the inner circumference of subterranean well 10', and unlined section 22'. Remote sensing system 23' includes electric current sensor 34' that is attached to liner 20' at a lower end of lined section 18' of subterranean well 10', and a plurality of electromagnetic sources 24' that are spaced along unlined section 22' of subterranean well 10'. Throughout this disclosure, discussions relating to subterranean well 10 and the components of subterranean well 10 apply equally to subterranean well 10' and the components of subterranean well 10'.

In an example of operation, electric current sensor 34 can be attached to liner 20 close to its lower end and electromagnetic sources 24 can be located along unlined section 22. The electric current amplitude selected for the electromagnetic sources 24 will be high enough to reach the penetration depth (detection distance) desired. Once the set of frequencies to be used is selected, the set of corresponding power for the electromagnetic sources 24 (which are proportional to their electric currents), can be selected according to the penetration depth (detection distance) desired and the sensitivity of the electric current sensor 34 so that a sufficient signal to noise ratio can be obtained from possible conductivity changes within the reservoir at the detection distance desired.

A source current can be generated with electromagnetic sources 24 and the resulting current induced in liner 20 by each electromagnetic source 24 can be measured with electric current sensor 34 to determine an original resulting current induced in liner 20 by each electromagnetic source 24. A majority of the current induced in liner 20 enters (or exits) liner 20 through the bottom end of liner 20 adjacent to unlined section 22. The resulting current being measured at this location by electric current sensor 34 provides maximum sensitivity for remote sensing system 23. The current will then progressively leak out from or exit (leak in to or enter) liner 20 and circulate back to electromagnetic sources 24.

At certain time intervals, a source current can once again be generated with electromagnetic sources 24 and the resulting current induced in liner 20 by each electromagnetic source 24 can be measured with electric current sensor 34 to determine multiple subsequent resulting currents induced in liner 20 by each electromagnetic source 24. The subsequent resulting currents can be compared to the original resulting current to determine a change in resulting current over time. Subsequent resulting currents can also be compared to determine changes (of the resulting currents) over time (i.e., time-lapse changes). Every time that a data acquisition is performed, the resulting current induced in liner 20 by normalizing electromagnetic source 38 can be used to normalize the resulting currents induced in liner 20 by each of the other electromagnetic sources 24.

For each of the electromagnetic sources 24 (other than normalizing electromagnetic source 38), the relative changes of the resulting current in liner 20, after making corrections using resulting currents from normalizing electromagnetic source 38, are essentially dependent on the relative proximity of the water front to the particular electromagnetic source 24, due to the changes in the electrical conductivity in the reservoir as hydrocarbons are displaced by water.

When the water front approaches one of the electromagnetic sources 24, the induced electrical current in liner 20 will increase, reach a maximum value, and then decrease as the water front continues to approach. For other electromagnetic sources 24 relatively farther from the approaching water front, the resulting current induced in liner 20 may not show an appreciable change over time, or may show only a small increase. The small increase in the resulting current in liner 20 for the electromagnetic sources 24 relatively farther from the approaching water front may be of a magnitude similar to the increase in the resulting current in liner 20 for the electromagnetic sources 24 that are closer to the approaching water front; however, the resulting current in liner 20 for the electromagnetic sources 24 relatively farther from the approaching water front will not have yet the subsequent decrease in magnitude. This feature allows for a fast qualitative interpretation to detect and locate the approaching water front that can be useful to quickly implement production management measures when inversion of the data to obtain the conductivity distribution and its changes over time in the reservoir cannot be obtained in a prudential amount of time.

Therefore, a change in electrical conductivity in the reservoir can be detected by reviewing the changes over time (time-lapse changes) in the resulting currents. By analyzing the changes in electrical conductivity in the reservoir (after the inversion of the data has been carried out) the distance from the wellbore 13 to the water front can be determined as a function of the position along central axis 32 in the unlined section 22. Furthermore, those skilled in the art will be able to observe that, if dipole sources with non-co-axial alignment and rotated at different azimuthal directions are used, a partial resolution in the azimuthal direction of the electric conductivity around the open-section of the well is also possible. Although including effective non-co-axially aligned dipoles for the intended penetration could be difficult in practice (due to the diameter of the well) and make the acquisition system more complex and less robust, this feature must be considered as an alternative embodiment of the systems and methods here presented.

The location of the water front relative to the wellbore 13 can be determined at distance of tens of meters, and in some favorable conditions, up to a few hundreds of meters. The change in resulting currents can be compared to identify an initial increase and posterior decrease (change over time) of the resulting current in liner 20 for a particular electromagnetic source 24. This decrease is identified as a polarity reversal of the time-lapse changes of the induced current by the electromagnetic source 24, and indicates that the water front is getting closer to that particular electromagnetic source. This polarity reversal of the changes in resulting current over time is easily and robustly recognizable.

The system and methods here presented are of particular use in horizontal wells, where open sections can be tens or hundreds of meters long. A considerable number of electromagnetic sources 24 can be used along the unlined section 22 and the polarity of the changes of the induced current over time can be determined for each electromagnetic source 24. Because the detection range of remote sensing system 23 can be of tens of meters or more, the monitoring schedule can be flexible and sparse and can still allow considerable time to apply changes to the production regime to avoid the water breakthrough or closer approach of the water front that could reduce flexibility on production management of the reservoir.

Electric current sensor 34 and electromagnetic sources 24 can be permanently installed in subterranean well 10, or can be temporarily installed in subterranean well 10 if, and when, there is a concern regarding a potential approaching water front. In either case, remote sensing system 23 can be controlled by control system 40 to schedule the timing of the generation of the source current and measuring of resulting current on demand, that is, only when checking of the reservoir conditions is recommended or needed. This flexibility of the monitoring schedule is possible due to the considerable detection range of the remote sensing system 23 of tens of meters or more from wellbore 13. This saves energy and operational costs, but still allows for considerable time to apply changes to the production regime to avoid the water breakthrough or closer approach of the water front that could reduce flexibility on production management of the hydrocarbon reservoir. Alternately, control system 40 can provide a pre-set schedule for the timing of activation of the sources and measurement of resulting induced currents.

Example Computer Model

Figure 4A:
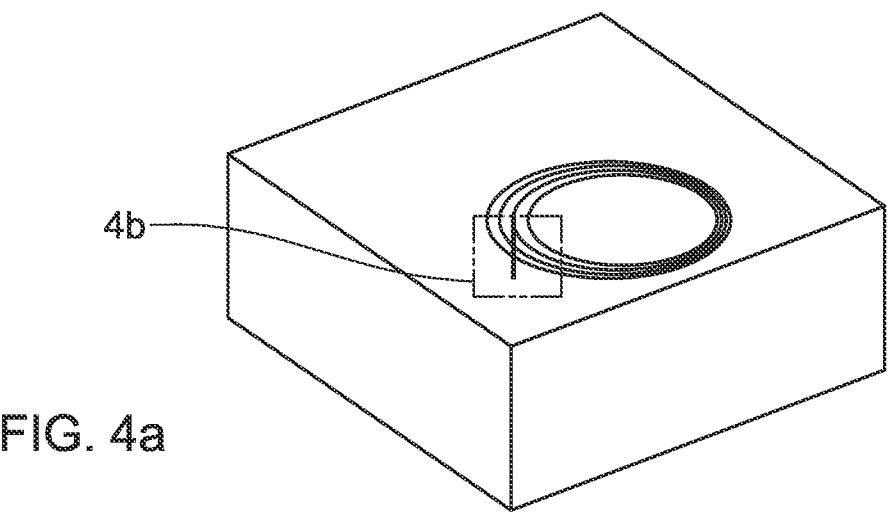
FIG. 4a is a representation of a reservoir model example used for computer modeling of the remote sensing system of an embodiment of this disclosure.

Turning now to FIGS. 2-3, 4a-4c, 5a-5c and 6a-6b, synthetic computer model of subterranean well 10 with a remote sensing system 23 was analyzed. The model of the lower end of liner 20 with an electric current sensor 34, and of an electromagnetic source 24 are shown in FIGS. 2-3, respectively. The reservoir model is shown in FIG. 4a. In the synthetic model, the subterranean well is vertical, and the water front moves horizontally from the injection well, which is located at a horizontal distance of about 3 km from the subterranean production well. The subterranean production well is cased from the surface down to the top of the reservoir, which is at a depth of about 1000 m. The subterranean production well becomes opened (not cased or unlined) through the 100 m thick reservoir and below. The model also assumes that the injected water is saline with a salinity approximately equal to that of sea water, and the porosity and original relative water saturation of the uninvaded reservoir are such that the resistivity of the water flooded reservoir is, at least, one order of magnitude smaller than the resistivity of the uninvaded reservoir. This contrast of electric resistivity (reciprocal of the electric conductivity) is typical and sufficient in this reasonably realistic example to allow for the detection of the approaching water front at a range of hundreds of meters from the production well as can be observed from the results of the time-lapse changes of the induced currents presented in FIG. 6a, and that we proceed to explain in detail below.

Figure 4B:
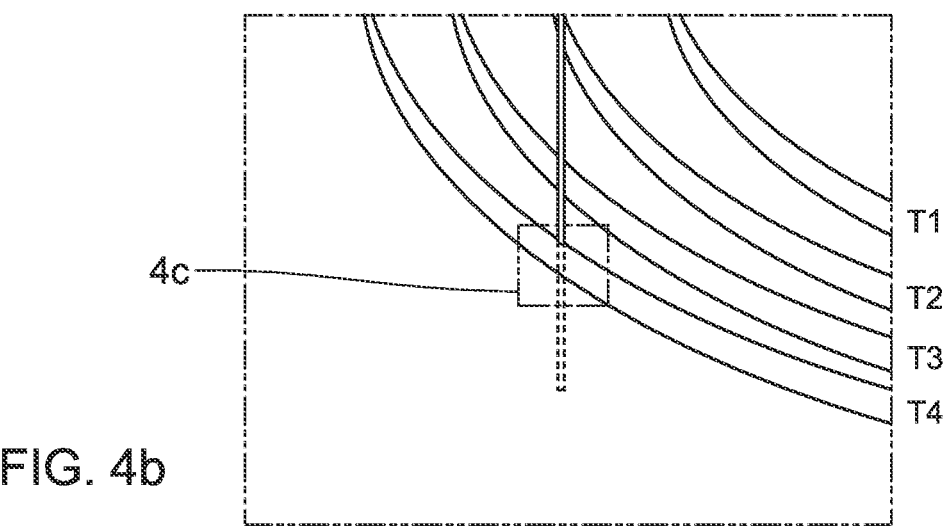

The synthetic model has a number of water front locations corresponding to various time-lapses T0, T1, T2, T3, and T4, as seen in FIG. 4b. The locations of the water front measured in horizontal distances from subterranean well 10 at each time-lapse are:

Time-lapse T0: No water front is present (initial condition before the water injection start)

Time-lapse T1: water front is at 800 m from the production well

Time-lapse T2: water front is at 510 m from the production well

Time-lapse T3: water front is at 250 m from the production well

Time-lapse T4: water front is at 20 m from the production well

Figure 4C:
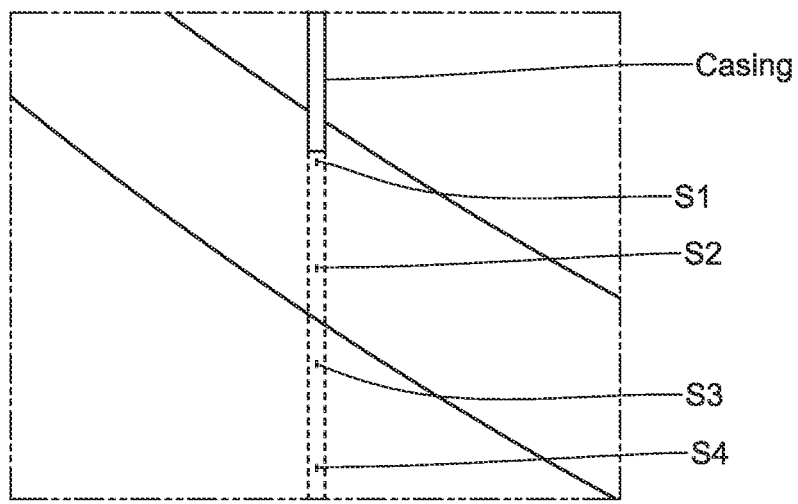

FIG. 4c is a close up view of the model of subterranean well 10 showing the locations of the model of electromagnetic sources 24 in the unlined section and the liner above the unlined section. Electromagnetic sources 24 are modeled as 2 m long electric dipoles, with amplitude currents of 0.5 A and a frequency of 10 Hz, located along the well axis, in the reservoir zone and below it. The electromagnetic sources in the model that are located below the reservoir were included in this synthetic example for comparison purposes and could be seen as if the unlined section is longer than 100 m and the water flood is moving only in the upper 100 m of the unlined section. The center of the first electromagnetic source S1 is located at 5 m below the top of the reservoir; the second electromagnetic source S2 at 50 m below the top of the reservoir, and the fourth electromagnetic source S4 at 150 m below the top of the reservoir.

Figure 5A:
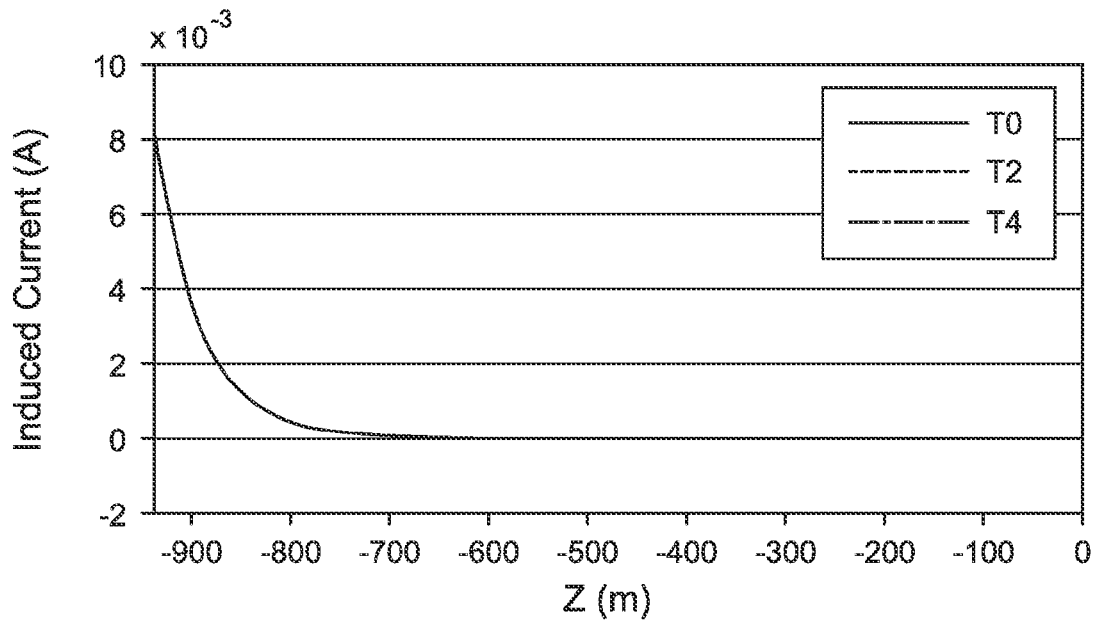
Figure 5B:
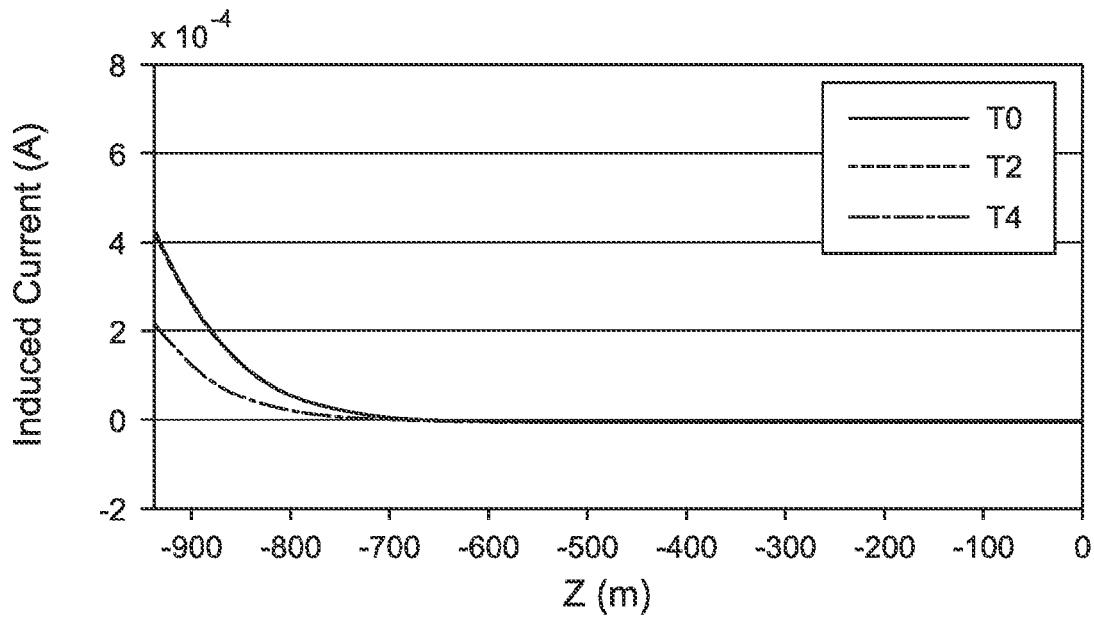
Figure 5C:
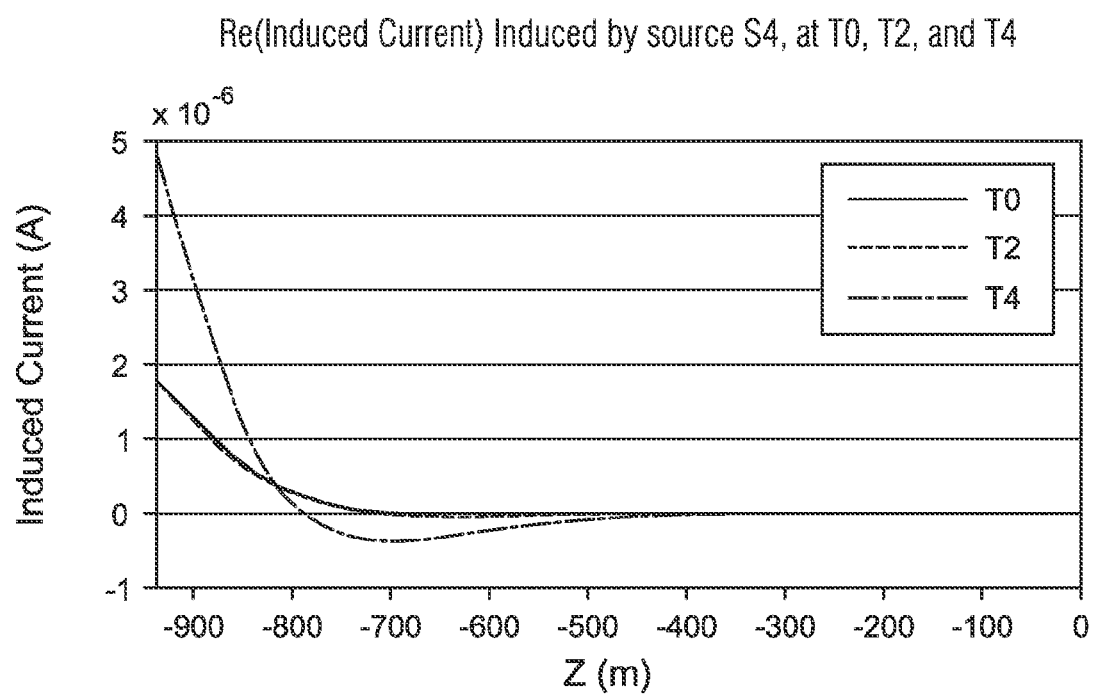

Turning to FIGS. 5a-5c, the magnitude of the real part of resulting current induced in the liner as a function of the vertical position along the z-axis of the subterranean well at time-lapses T0, T2, and T4 by the electromagnetic sources S1. S2, and S4, respectively, are shown. It can be seen that the self-relative time-lapse variations of the resulting currents induced by source S1, which in the model acts as the normalizing electromagnetic source, is generally unchanged at the scale used in FIG. 5a. Also, the magnitude of the resulting current induced by the electromagnetic source S1 is several orders of magnitude bigger than the resulting currents induced by electromagnetic sources S2 and S4 (FIGS. 5b-5c). This is expected because the electromagnetic source S1 is very close to the casing or liner lower end or edge.

In addition, the self-relative time-lapse variations of the resulting currents induced by electromagnetic sources S2 and S4 are bigger than those induced by electromagnetic source S1. This is due to the fact that the distance from the electromagnetic source S1 to the end of the liner is very small compared to the distance to the zone of the reservoir where changes of electrical conductivity (due to the approaching water front) are occurring, whereas for electromagnetic sources S2 and S4 the distances to the liner edge are bigger than for S1 and these distances start to become comparable with the distance to the zone of the reservoir where changes of electrical conductivity are occurring. Therefore, the changes of electrical conductivity in the medium (in this case, the reservoir) have a greater effect on the path of the resulting currents induced by electromagnetic sources S2 and S4 in the medium, and therefore, the current induced in the liner.

It is also worth noting that the magnitude of the resulting currents induced by electromagnetic sources S2 and S4 increase several orders of magnitude when the water front approaches the production well. For electromagnetic source S2, the change of the resulting current is negligible for the time interval T0 to T2 but decreases significantly for the time interval T2 to T4. For electromagnetic source S4, the change of the resulting current is negligible for the time interval T0 to T2 and increases significantly for the time interval T2 to T4.

Figure 6A:
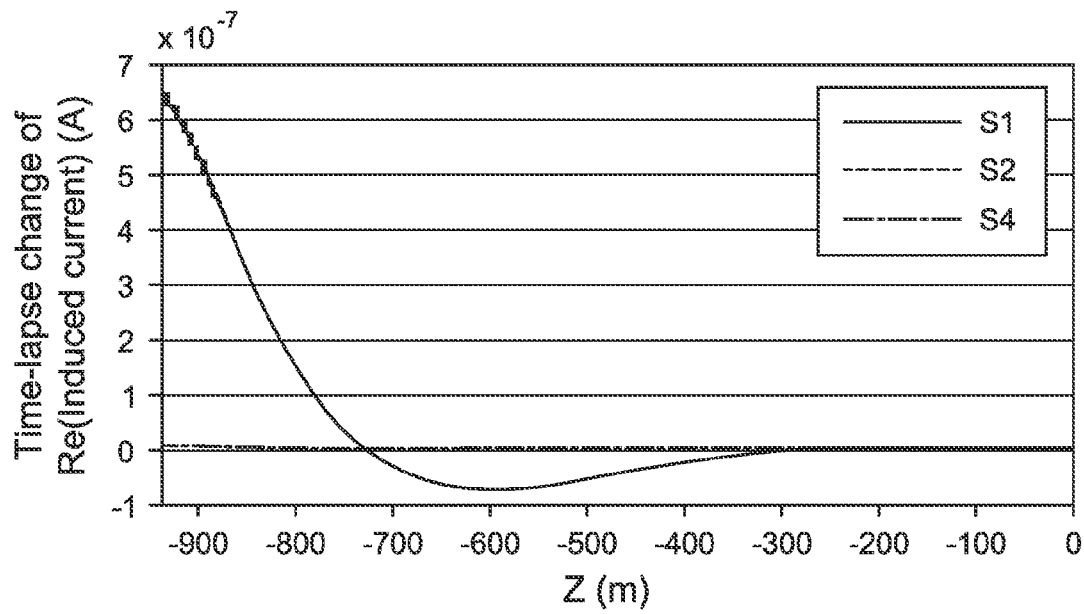
Figure 6B:
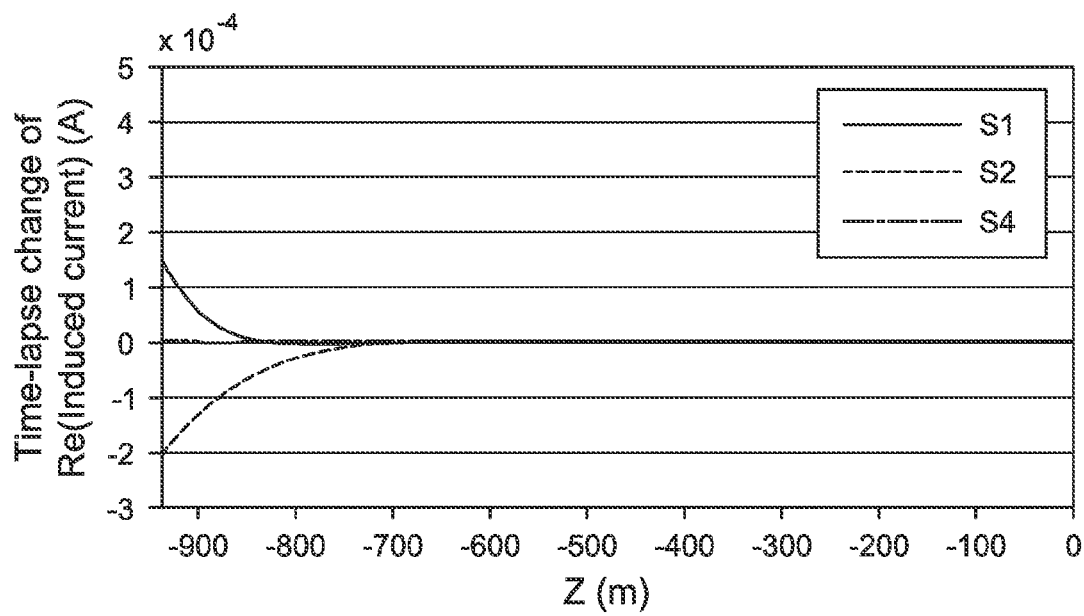

Looking now at FIGS. 6a-6b, the time-lapse change of the real part of the resulting current induced in the liner by the electromagnetic sources S1, S2 and S4 along the z-axis of the well are shown for time-lapses interval T0 to T2, and T0 to T4, respectively. For time-lapse interval T0-T2 the resulting current induced in the liner by electromagnetic source S1 and S2 show a significant increase, and the resulting current induced in the liner by electromagnetic source S4 shows a relatively small increase. For time-lapse interval T0-T4 the resulting current induced in the liner by electromagnetic sources S1 and S2 again show a significant change at the scale of FIG. 6b and the resulting current induced in the liner by electromagnetic source S4 shows a relatively smaller change.

For time-lapse interval T0-T4 the resulting current induced in the liner by source S2 reduces when the water front approaches electromagnetic source S2 at time-lapse T4, so that the time-lapse change of the resulting current induced in the liner by electromagnetic source S2 changes polarity and is a negative number on the chart of FIG. 6b for $Z \leq -900$ m (which corresponds to the lower section of the liner near the top of the reservoir). For electromagnetic sources S1 and S4 the time-lapse changes for time-lapse interval T0-T4 keep the same polarity so that they are a positive numbers on the chart of FIG. 6b for $Z \leq -900$ m. This is due to the different relative locations and distances of the electromagnetic sources with respect to the approaching water front. The electromagnetic source S2 at time-lapse T4 becomes the closest source to the water front but still relatively farther from the liner, and therefore, the current from electromagnetic source S2 injected in the formation will preferentially circulate (be shunted) through the increased electrical conductivity zone of the reservoir that is being water flooded.

Therefore, a direct qualitative interpretation of the relative position of the approaching water front is possible. In addition, after correction and normalization for possible changes of the electric coupling of the liner to the surrounding geology given by the resulting current induced by electromagnetic source S1, an inversion of the time-lapse change of the resulting induced current in the liner due to the differently positioned electromagnetic sources can provide the distance of the water front to the subterranean well as a function of the position along the production well axis in the vicinity of the unlined section.

As discussed herein, remote sensing system 23 of this disclosure has the advantages of providing a large receiver antenna in the form of liner 20 that allows the use of low frequencies and greater detection range within the reservoir.

The more effective and larger antenna in the form of liner 20 also provides an inherent amplification to remote sensing system 23 of several orders of magnitude, making remote sensing system 23 more robust than other entirely borehole electromagnetic sensing techniques. The normalization mechanism in the form of normalizing electromagnetic source 38 allows remote sensing system 23 to be immune to changes in the electrical coupling of liner 20 to the formation surrounding liner 20.

Remote sensing system 23 and its methods of use therefore provide a greater range of detectability and simpler interpretation of the acquired data compared to current technology. The borehole instrumentation of remote sensing system 23 are also simple, robust, and the results are immune to the electrical coupling of electromagnetic sources 24 through the use of simple platted source electrodes and controlled and monitored source currents, and immune to the electrical coupling of liner 20 to the surrounding formation through a normalizing procedure using the normalizing electromagnetic source 38. In addition, because the remote sensing system 23 is borehole based, it is less sensitive to changes of the background conductivity far from the reservoir and subterranean well 10, such as, for example, changes of electrical conductivity or resistivity in the near-surface, which considerably affect borehole-to-surface, surface-to-borehole or surface-to-surface electromagnetics techniques and therefore, for those techniques, extra data processing and measurements are required in an attempt to compensate for the effects of near-surface changes. All these factors make the remote sensing system 23 more effective and yet relatively inexpensive for deployment in the borehole environment.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method for sensing a condition of a hydrocarbon reservoir from a subterranean production well having a lined section with a conductive liner and an adjacent unlined section, the method comprising the steps of:
    (a) attaching an electric current sensor to the conductive liner, proximate to a lower end of the conductive liner adjacent to the unlined section, to measure the electric current induced on the conductive liner;
    (b) locating a plurality of electromagnetic sources along the adjacent unlined section; and
    (c) generating a source current with the electromagnetic sources, receiving the source current with the conductive liner operating as an antenna, and measuring a resulting current induced in the conductive liner by each electromagnetic source with the electric current sensor.

2. The method according to claim 1, further comprising:
    (d) repeating step (c) and calculating a change in electrical conductivity of the hydrocarbon reservoir by comparing the resulting current in the conductive liner by each electromagnetic source measured in step (c) to the resulting current in the conductive liner by each electromagnetic source measured in step (d).

3. The method according to claim 2, further comprising analyzing the change in electrical conductivity by inversion of the data and determining a distance from the subterranean well to a possibly approaching water front.

4. The method according to claim 2, further comprising determining the location along and distance from the subterranean well to a possibly approaching water front by determining a polarity change of time-lapse changes of the resulting current induced in the conductive liner by each of the electromagnetic sources.

5. The method according to claim 3, wherein the step of determining the distance from the subterranean well to the water front includes determining the distance from the subterranean well to the water front at a range of up to a few hundreds of meters.

6. The method according to claim 1, wherein one of the plurality of electromagnetic sources is located proximate to the lower end of the lined section of the subterranean well, the method further comprising using the resulting current induced in the conductive liner by such electromagnetic source to normalize the resulting current induced in the conductive liner by each of the other electromagnetic sources.

7. The method according to claim 1, wherein step (c) comprises generating the source current with a frequency in the range of 0.1 Hz to 10 KHz.

8. The method according to claim 1, wherein step (c) comprises generating the source current with an amplitude selected to obtain a desired penetration depth.

9. The method of claim 1, where the conductive liner is a casing.

10. A method for sensing a possibly approaching water front, in a hydrocarbon reservoir, to a subterranean well having a lined section with a liner and an adjacent unlined section, the method comprising the steps of:
    (a) attaching an electric current sensor to the liner at a lower end or edge of the lined section adjacent to the unlined section;
    (b) locating a plurality of electromagnetic sources along the unlined section;
    (c) generating a source current with the electromagnetic sources, and measuring an original resulting induced current in the liner by each electromagnetic source with the electric current sensor;
    (d) repeating step (c) and comparing a subsequent resulting induced current in the liner by each electromagnetic source to the original resulting induced current by the corresponding source to determine a change in resulting induced currents over time; and
    (e) inverting the original resulting induced currents and the subsequent resulting induced currents or the change in resulting induced currents over time to obtain an electric conductivity distribution in the reservoir, a change over time of the electric conductivity distribution in the reservoir and identify the possibly approaching water front.

11. The method according to claim 10, wherein one of the plurality of electromagnetic sources is located proximate to the lower end of the lined section, the method further comprising using the resulting current induced in the liner by such electromagnetic source to normalize the resulting currents due to the other electromagnetic sources.

12. The method according to claim 10, wherein step (c) comprises generating the source current with a frequency in the range of 0.1 Hz to 10 KHz.

13. The method according to claim 10, wherein step (c) comprises generating the source current with an amplitude to obtain a desired penetration depth.

14. The method of claim 10, where the liner is a casing.

15. A system for sensing a condition of a hydrocarbon reservoir from a subterranean well having a lined section with a conductive liner and an unlined section, the system comprising:
a plurality of electromagnetic sources spaced along the unlined section, the electromagnetic sources selectively generating a source current; and
an electric current sensor attached to the conductive liner at a lower end of the lined section, the electric current sensor operable to measure a resulting current induced in the conductive liner from the source current received by the conductive liner from the electromagnetic sources with the conductive liner operable as an antenna.

16. The system according to claim 15, wherein each electromagnetic source comprises a galvanic electric dipole having an electrode at each end, separated by isolating material.

17. The system according to claim 15, further comprising a conductive liner extension located at an end of the electric current sensor opposite the conductive liner, the electric current sensor electrically connecting between the conductive liner and the conductive liner extension, and measuring the current flowing through the conductive liner to the conductive liner extension.

18. The system according to claim 15, wherein the plurality of electromagnetic sources includes a normalizing electromagnetic source located proximate to the lower end of the lined section and spaced apart from the conductive liner.

19. The system according to claim 15, further comprising a control system scheduling a timing of the generation or activation of the electromagnetic sources and a sensing of the resulting induced currents.

20. The system according to claim 15, further comprising a data collection and analysis system gathering the resulting current induced in the conductive liner by each electromagnetic source and determining a distance from the subterranean well to a possibly approaching water front.

21. The system according to claim 15, wherein the plurality of electromagnetic sources include an array of multiple controlled sources spaced in a single tool.

22. The system according to claim 15, wherein the plurality of electromagnetic sources include a tool that has a single source and is operable to be moved along the unlined section of the subterranean well and be activated at different pre-established locations along the subterranean well.

23. The system of claim 15, where the conductive liner is a casing.

24. A system for sensing a condition of a hydrocarbon reservoir from a subterranean well having a lined section with a conductive liner and an unlined section, the system comprising:
a plurality of electromagnetic sources spaced along one selected from a group consisting of the unlined section of the subterranean well, an unlined section of an adjacent well, and an unlined section of a multilateral portion of the subterranean well, the electromagnetic sources selectively generating a source current; and
an electric current sensor attached to a conductive liner of one selected from a group consisting of the subterranean well, the adjacent well, and the multilateral portion of the subterranean well, the electric current sensor operable to measure a resulting current induced in the conductive liner from the source current from the electromagnetic sources with the conductive liner operable as an antenna.

25. The system of claim 24, where the conductive liner is a casing.

* * * * *